United States Patent Office 3,442,840
Patented May 6, 1969

3,442,840
COPOLYMERS OF OLEFINES WITH COMPOUNDS HAVING A PHENANTHRENE NUCLEUS
Janine Ourgaud, Paris, France, assignor to Societe Nationale des Petroles d'Aquitaine, Paris, France
No Drawing. Filed Apr. 20, 1966, Ser. No. 543,950
Claims priority, application France, Apr. 20, 1965, 13,767
Int. Cl. C08f 1/42, 15/40, 15/14
U.S. Cl. 260—27          11 Claims

ABSTRACT OF THE DISCLOSURE

Substantially linear, amorphous, unsaturated and vulcanizable copolymers of high molecular weight are prepared by polymerizing a mixture of at least one olefin and a resinic acid derivative, containing a nucleus of the phenanthrene type, in the presence of a Ziegler type catalyst.

---

The present invention relates to a new type of copolymers of olefines, particularly α-olefine, with compounds characterized by a structure with a phenanthrene nucleus. It is particularly concerned with copolymers of α-olefines with resinic acid derivatives. Among the new copolymers, the invention is especially concerned with the terpolymers obtained from ethylene, an aliphatic α-olefine and a resinic derivative, such as neo-abietic acid or pimaric acid, of which the molecule contains the nucleus of the phenanthrene type. The products mainly envisaged by the invention are practically linear, amorphous, unsaturated and vulcanizable copolymers of high molecular weight.

The terpolymers which are of particular interest according to the invention are obtained from monomers which are, on the one hand, ethylene, and, on the other hand, an aliphatic α-olefine of the general formula R—CH=CH$_2$, of which the alkyl grouping R contains 1 to 6 carbon atoms and a derivative of resinic acids.

The invention also relates to a process for the preparation of these new copolymers.

It is known to prepare rubber-like copolymers from ethylene and α-olefines, for example ethylene and propylene, but these materials have the disadvantage of being difficult to vulcanize, on account of their saturation. In order to obtain elastomers which can be vulcanized by the usual means, it is necessary for the molecule to have a certain degree of unsaturation. The present invention does in fact just enable the new copolymers to have a degree of unsaturation which is sufficient for the conventional vulcanization with sulphur to become possible, in the same way as the vulcanization by means of free radical formers, particularly peroxide.

The process according to the invention makes it possible to obtain elastomers which still preserve the interesting properties of rubbers of the ethylene-propylene type, that is to say, an outstanding resistance to ozone, bad weather influences, heat and chemical agents, allied with good mechanical properties. These advantages are obtained by virtue of the choice of a plasticizer which provides the unsaturation, and also the thoroughly investigated proportion of this constituent in the copolymer; from this latter point of view, the products according to the invention have particularly interesting qualities when there is at least one double bond for 50 ethylene-α-olefine units, especially 50 ethylene-propylene units. On the other hand, the process according to the invention enables the unsaturation to be distributed very regularly in the terpolymer, this making possible the complete and uniform cross-linking of the molecules during the vulcanization reaction. Actually, the invention leads to terpolymers which, before vulcanization, are characterized by a practically amorphous state, this indicating a distribution of the monomers at random and an absence of sequences of the same monomer. Because of these qualities, the new copolymers, once vulcanized, give interesting products which can be used for the manufacture of different objects, as for example electric cables, conveyor belts, tubes, pneumatic tyre covers and others.

The new process consists in copolymerizing ethylene with one or more α-olefines, more especially propylene, and a certain proportion of resinic acid in the form of a metal salt or an ester, in the presence of a catalyst of the Ziegler type.

The resinic acids of which the derivatives are used in the process according to the invention form part of the family comprising tricyclic diterpenes, that is to say, compounds characterized by the phenanthrene nucleus. It is in particular possible to use the resinic compounds of the abietic type and the compounds of the pimaric type, all of the summary formula $C_{20}H_{30}O_2$, containing one extra nuclear double bond.

The resinic acid of the abietic type and having the formula indicated below is neoabietic acid

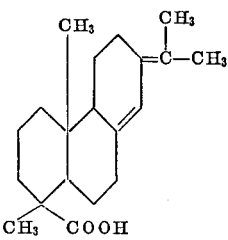

The pimaric type comprises pimaric acid with two unconjugated double bonds, one being intracyclic and the other extracyclic.

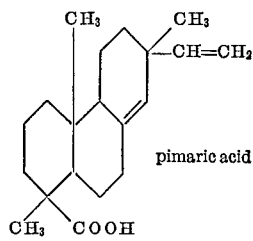

pimaric acid and isopimaric acid, which also has two unconjugated double bonds, one being intracyclic and the other extracyclic, which forms a stereo isomer of pimaric acid.

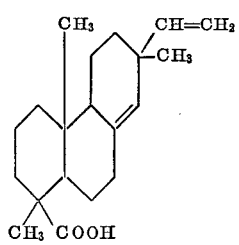

isopimaric acid

The resinic acids are used in the copolymerization according to the invention in the form of their metal salts or their esters. It is possible with preference to use resinates of the metals of Group II and Group VIII, series 4, of the Periodic System of the elements, for example of Mg, Ca, Zn, Cd, Fe, Co, etc., without the resinates of other metals being excluded. It is similarly possible to use particularly alkyl esters, preferably containing 1 to 6 carbon atoms; thus, methyl, ethyl, propyl, butyl and other resinates can be used.

The derivatives of dienic resinic acids as indicated above can be used in the pure state or in admixture with other resinic acid derivatives, which are unsaturated to different degrees or even completely saturated; such mixtures can be obtained from colophony.

In the copolymerization reactions with the olefines according to the invention, one of the double bonds of the unsaturated resinic derivatives participates in the copolymerization reaction, while the second double bond remains available for subsequent reactions, especially for the cross-linking reaction. This fact has been revealed by an infra-red examination of the copolymers obtained by the new process; this examination has shown the presence of unsaturations which permit the subsequent vulcanization of the copolymer by sulphur, according to the methods normally used for rubber.

The copolymerization according to the invention is catalyzed by the known systems which comprise an alkyl compound of one or more metals of the Groups I, II or III of the Periodic System of the elements (A) and a halogenated compound of a transition metal of one of the Groups IV, V or VI (B). Such catalytic systems, formed for example by aluminium alkyls and halides of Ti, Zr, V, Mo, W, etc., have for example been described in French Patent No. 1,121,962 of the June 5, 1955 and in French Patent No. 1,162,882 of the Dec. 20, 1956.

For the formation of the catalytic system in which the compounds (A) can be mixed with the compounds (B) before the introduction thereof into the reactor, the catalyst can thus be pre-formed and optionally "aged" in order then to be introduced into the mixture to be polymerized in a continuous or intermittent manner.

The catalytic system preferably comprises quantities of compounds A and B such that the molar ratio between the metal of A and the transition metal of B is between 1 and 30.

The polymerization is effected in the presence of a third solvent or even with the excess of one of the monomers, for forming the liquid phase of the reaction medium. The solvents which can be used are the same as those which are usually employed in polymerization and copolymerization reactions of olefins, namely, aliphatic, cycloaliphatic or aromatic hydrocarbons, for example, heptane, cyclohexane, benzene, ethylbenzene or mixtures of such solvents. It is also possible to use halognated hydrocarbons which are neutral with respect to the catalyst, for example, chlorobenzene, tetrachlorethylene.

The copolymerization generally takes place between −80° C. and +110° C., the preferential range being from −30° to +50° C.

Although the pressures currently applied are of the order of 1 to 10 atm., it is possible and sometimes necessary to work under higher or lower pressures. In particular, it may be advantageous to work at a temperature and pressure which are such that one or more of the monomers present are liquid during the reaction and thus serve as distribution agent.

The unsaturated resinic compound which is added in accordance with the invention is generally all introduced into the reactor, as such or even in solution in a solvent, before adding the catalytic system. Nevertheless, it is possible to introduce all or part of this resinic compound during the polymerization, either continuously or intermittently.

The process according to the invention can be carried out continuously; in this case, the solvent, the monomers and the catalytic system are introduced continuously into a polymerization zone with rates of flow such that their residence time in this zone is sufficient to obtain the desired concentration of copolymers in the reaction mixture. Generally speaking, the necessary residence time becomes shorter when the concentration of the monomers and catalysts in the supply mixture is increased.

In the new products according to the invention and particularly in the terpolymers, the lower limit of the ethylene content is not decisive, but the upper limit should preferably be 75 mol percent in order to avoid any crystallinity of the polyethylene type. As regards the content of α-olefine in the amorphous terpolymers, it can normally vary from 5 to 75 mol percent. The total content of diene in the terpolymer, that is to say, the unsaturated resinic derivative as hereinbefore defined, can vary from 0.1 to 20 mol percent. In general terms, the composition of the copolymers according to the invention can vary within wide limits as a function of those of the mixture of monomers.

The duration of the copolymerization reaction, which primarily is a function of the temperature and the nature of the catalytic system, generally varies between approximately one hour and 8 hours.

On completing the operation, the catalyst is destroyed in known manner, the reaction medium is subjected to steam distillation in vacuo at a temperature from 30° to 60° C., with the object of eliminating the solvent and unconverted monomers. The copolymer obtained or "rubber," is finally dried in vacuo at about 40° C.

The rubber thus obtained has a sufficient degree of unsaturation to be capable of being vulcanized by the conventional procedures which are applicable to unsaturated elastomers. It can be carried into effect with the means usually employed in the rubber industry.

The following examples illustrate the invention without limiting the scope thereof.

Example 1

The reaction apparatus consists of a glass cylinder with a diameter of 10 cm. and a capacity of 1000 ml., equipped with a stirrer device and supply and discharge tubes, and is immersed in a bath thermostatically controlled at +20° C.±1° C. The inlet tube reaches the bottom of the cylinder and terminates in a distribution ring with a diameter of 8 cm.

800 ml. of anhydrous cyclohexane containing 227 mg. of dissolved magnesium neo-abietate are introduced into the reactor. The stirrer mechanism is set in operation and a stream of dry nitrogen is caused to pass into the installation for 1 hour, followed by a mixture of propylene and ethylene in gaseous form and with the molar ratio of 2.9, the rate of flow being 60 standard liters per hour.

Two millimols of $VOCl_3$ in 100 ml. of cyclohexane and 12 millimols of diethyl-aluminum chloride in 100 ml. of anhydrous cyclohexane are separately introduced by siphoning and under nitrogen pressure into 2 flasks which are above the reactor. As soon as the solvent of the reactor is saturated with gas, the molar ratio of the propylene-ethylene mixture is brought to 0.5 and the pair of catalysts are separately introduced, drop-by-drop. The propylene-ethylene mixture is caused to flow at a rate of 60 normal litres per hour and is discharged continuously. After 1½ hours have elapsed since the injection of the catalyst, the reaction is stopped by adding 30 ml. of absolute alcohol. The product is purified in a separating funnel, the product being coagulated and being taken up several times in absolute alcohol. After drying in vacuo, 18.5 g. of a solid product are obtained, this having the appearance of a non-vulcanized elastomer and is completely soluble in boiling normal heptane. The infra-red spectrum of the product shows that the molar ratio between ethylene and propylene is about 1:1 and that the double bonds exist. The content of magnesium neo-abietate reaches 0.65% by weight.

Example 2

The reaction apparatus is similar to that of Example 1. 800 ml. of benzene freshly distilled over sodium containing 6 g. of cobalt neo-abietate are introduced into this apparatus, which is kept at +20° C.

The course of the reaction is identical with that described in Example 1.

Introduction of the gaseous propylene-ethylene mixture in the ratio 2.9 at the rate of 60 normal liters per hour.

1st burette: 4 millimols of VOCl$_3$ in anhydrous cyclohexane;
2nd burette: 26 millimols of (C$_2$H$_5$)$_2$AlCl in anhydrous cyclohexane.

After saturation, introduction of the gaseous propylene-ethylene mixture in the ratio 0.5 at the rate of 60 normal litres per hour and separate and dropwise injection of the two catalysts.

Continuous circulation of the gaseous mixture.

Stoppage of the reaction, 1½ hours after starting the injection of the catalyst, with 50 cc. of absolute alcohol.

Purification and separation of the product as in 1.

After drying in vacuo, 32 g. of a solid product are obtained, this having the appearance of an unvulcanized elastomer and being completely soluble in boiling normal heptane. The infra-red spectrum of the product shows that the molar ratio of ethylene/propylene is about 1 and that the double bonds exist.

Example 3

The reaction apparatus is similar to that of Example 1. 700 ml. of cyclohexane and 50 ml. of benzene freshly distilled over sodium containing 2.5 g. of iron neo-abietate are introduced into the apparatus, which is kept at +20° C.

Introduction of the gaseous propylene-ethylene mixture in the ratio 2.9 at the rate of 60 normal litres per hour.

1st burette: 5 millimols of VOCl$_3$ in anhydrous cyclohexane;
End burette: 30 millimols of (C$_2$H$_5$)$_2$AlCl in anhydrous cyclohexane.

After saturation, introduction of the gaseous propylene-ethylene mixture in the ratio 0.5 at the rate of 60 normal litres per hour and separate and dropwise injection of the two catalysts.

Examples 4, 5, 6

In each of the Examples 1, 2 and 3 respectively, and after 10 minutes, from the start of the reaction, 50 ml. of benzene containing 2.5 g. of iron neo-abietate are introduced dropwise over a period of half an hour.

Continuous circulation of the gaseous mixture.

Stoppage of the reaction, 1½ hours after starting to inject the catalyst, with 50 ml. of absolute alcohol.

Purification and separation of the product as in 1.

After drying in vacuo, a solid product is obtained having the appearance of an unvulcanized elastomer and completely soluble in boiling normal heptane. The infra-red spectrum of the products shows that the molar ratio of ethylene/propylene is about 1 and that the double bonds exist.

Example 7

The experiment is carried out according to Example 1, but instead of magnesium neo-abietate, 260 mg. of aluminium pimarate are used. The obtained result is the same that in Example 1.

Example 8

Carried out as in Example 1, but with 304 mg. of zinc isopimarate. The obtained result is the same that in Example 1.

I claim:

1. A process for the preparation of copolymers of a resinic acid selected from the group consisting of neo-abietic, pimaric, isopimaric acid and mixtures thereof, comprising subjecting to polymerization a mixture of at least one olefin with 0.1 to 20 mol percent of a resinic acid derivative selected from the group consisting of the metal salts and alkyl esters of a resinic acid selected from the group consisting of neo-abietic, pimaric, isopimaric acid and mixtures thereof in the presence of a Ziegler catalyst under a pressure of the order of 1 to 10 atm. and at a temperature between about −80° C. and 110° C.

2. The process of claim 1 wherein the olefin is an α-olefin.

3. The process of claim 1 wherein the olefin is ethylene.

4. The process of claim 1 wherein a mixture of ethylene with at least one α-olefin is used.

5. The process of claim 1 wherein the polymerization takes place between −30° C. and +50° C., the reaction mixture contains less than 75 mol percent of ethylene and 5 to 75 mol percent of α-olefin.

6. Copolymers of a resinic acid selected from the group consisting of neo-abietic, pimaric, isopimaric acid and mixtures thereof prepared by the process of claim 1.

7. An elastomer comprising the product formed by vulcanizing with sulfur at least one of the copolymers defined in claim 6.

8. An elastomer comprising the product formed by vulcanizing by means of a free radical former at least one of the copolymers defined in claim 6.

9. The process of claim 4 wherein the α-olefin is propylene.

10. The process of claim 1 wherein the polymerization takes place between about −30° C. and 50° C.

11. The process of claim 1 wherein the catalyst is constituted by a major proportion of diethyl-aluminum chloride and a minor proportion of vanadium oxychloride.

References Cited

UNITED STATES PATENTS 3,166,538  1/1965  Olson et al. _____ 260—27

HOSEA E. TAYLOR, *Primary Examiner.*

W. E. PARKER, *Assistant Examiner.*

U.S. Cl. X.R.

260—79.5, 80.78, 87.3, 88.1